March 11, 1924. 1,486,562
C. B. BEMIS
DISPENSING APPARATUS FOR CONFECTIONS
Filed April 19, 1922  2 Sheets-Sheet 1

Inventor
C. B. Bemis.
By Mason Fenwick & Lawrence,
Attorney

March 11, 1924.  
C. B. BEMIS  
1,486,562  
DISPENSING APPARATUS FOR CONFECTIONS  
Filed April 19, 1922  2 Sheets-Sheet 2

Inventor  
C. B. Bemis.  
By Mason Fenwick & Lawrence,  
Attorney

Patented Mar. 11, 1924.

1,486,562

UNITED STATES PATENT OFFICE.

CHARLES B. BEMIS, OF ATHOL, MASSACHUSETTS.

DISPENSING APPARATUS FOR CONFECTIONS.

Application filed April 19, 1922. Serial No. 555,590.

*To all whom it may concern:*

Be it known that I, CHARLES B. BEMIS, a citizen of the United States, residing at Athol, in the county of Worcester and State of Massachusetts, have invented certain new and useful Improvements in Dispensing Apparatus for Confections; and I do hereby declare the following to be a full, clear, and exact description of the invention, such as will enable others skilled in the art to which it appertains to make and use the same.

This invention relates to dispensing apparatus for frozen confections such as ice cream bars and has for its object to provide a carrier and container for said bars of such character that the ice cream bars may be readily served from a container without admitting a large quantity of warm air into said container. Another object of the invention is to pack the ice cream bars in sealed packages which are attached to each other in the form of a chain, said packages being severable from each other as they are dispensed from the apparatus.

The above and other features of novelty will appear from the detailed description of the invention, taken in connection with the accompanying drawings forming part of this specification.

Figure 1:
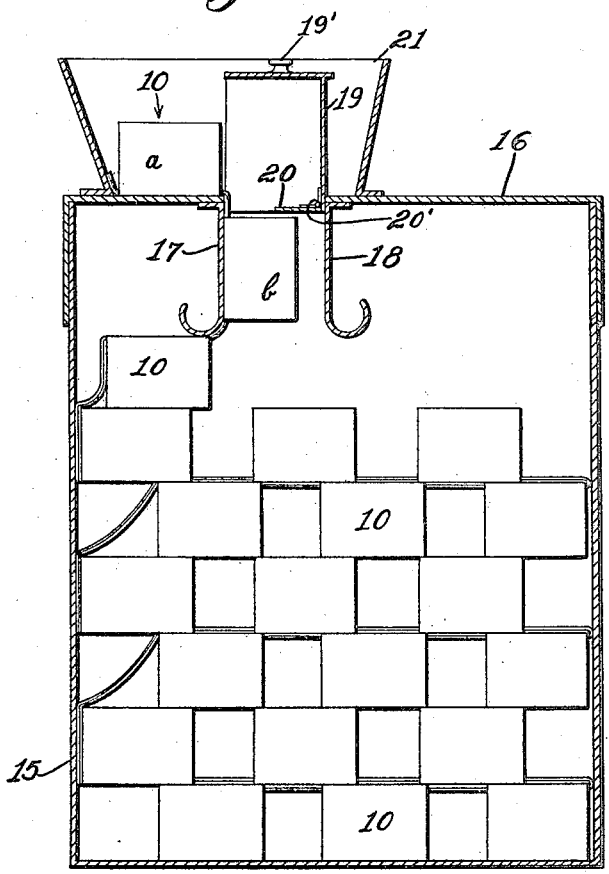
Figure 1 is a vertical section through the container embodying the preferred form of the invention.
Figure 2:
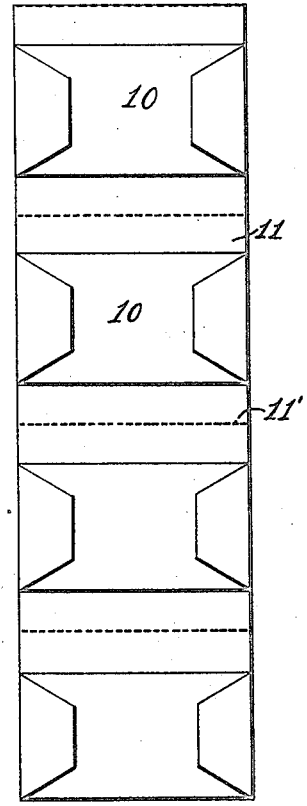
Fig. 2 is a plan view of the chain or series of pockets within which the ice cream bars are packed.
Figure 3:
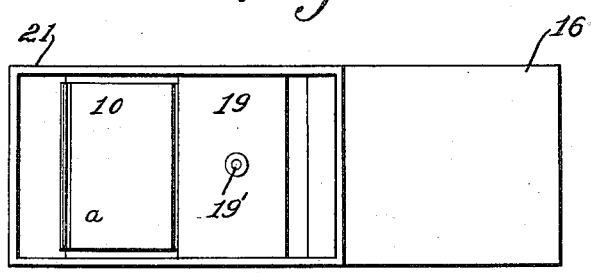
Fig. 3 is a plan view of Fig. 1.
Figure 5:
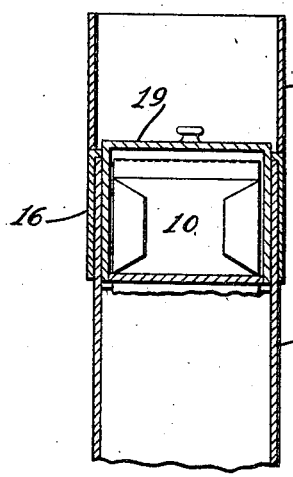
Fig. 5 is a vertical section on line 5—5 of Fig. 4.

10 designates a pocket within which ice cream bars may be packed and sealed, said pockets being secured to a strip of suitable material 11 such as paper, the pockets being spaced apart and the strip between them being preferably perforated as at 11' to permit ready severance of a pocket from the chain. The chain may consist of any convenient number of pockets and the material of which the pockets is made may likewise be of any suitable character. The chain or package of ice cream bars is adapted to be placed within a suitable container 15 which latter will be placed in a suitable cooling medium such as ice or brine. The mouth of the container is closed by a removable cover 16. Depending from the cover is a guide wall 17 curved at its lower end to form a guide or back against which the chain of pockets may ride. Opposite this guide 17 is a second guide 18, the two forming a channel or guide way for a vertically movable elevator 19, which at its lower end has an upwardly swinging trap door 20. This trap door is adapted to form a shelf on which the pockets 10 may rest one at a time before they are passed from the inside to the outside of the container.

Figure 4:
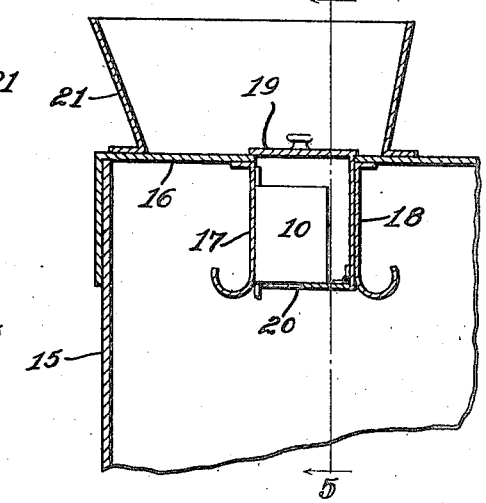
Fig. 4 is an enlarged detail view in vertical section of the seal or cover portion of the container.
Figure 6:
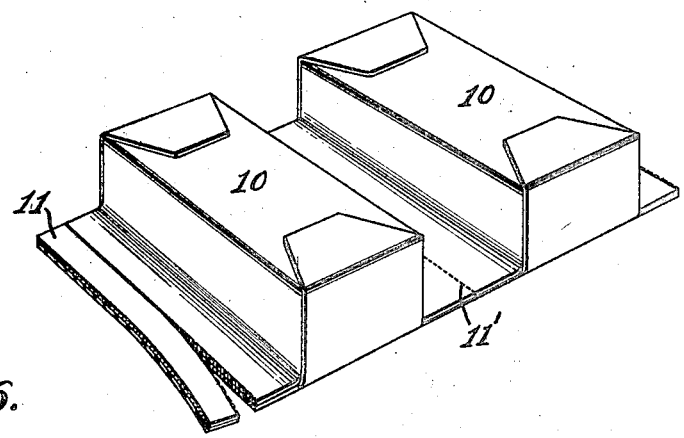
Fig. 6 is a perspective view of the pockets within which the ice cream bars are packed.

In Fig. 1 the elevator is shown as at its upward limit of movement after having elevated a pocket $a$ of ice cream out of the container. Before severing the pocket $a$ from the adjacent pocket, the elevator is depressed whereupon the trap door 20 swings upwardly sufficiently to permit it to pass between the pocket $b$ lying against the guide 17 and the wall 18. When the elevator is pushed home the trap door 20 will spring into place beneath the block $b$ and support the same as shown in Fig. 4 and the block $a$ may then be severed from the chain along the corrugated line 11' as will be readily understood.

The elevator 19 is in the form of a drawer having a knob 19' which may be grasped by the fingers for up and down movement and the trap door 20 is hinged as at 20' to one wall of the drawer. I prefer to provide a funnel-like guard 21 on the cover surrounding the elevator mechanism to prevent damage to the same.

This invention enables the container to be kept cool at all times inasmuch as very little warm air is admitted into the same in the operation of extracting a bar of ice cream therefrom, and furthermore this form of packing the ice cream bars, namely, of inserting them in pockets in the form of a chain, forms a very convenient method for handling the ice cream bars in quantities.

What I claim is:

1. A dispensing apparatus for ice cream bars comprising in combination, a chain of pockets within which ice cream bars may be housed, a container for receiving said chain, a cover for said container, a pocket support depending from said cover, and means for elevating said cover and support to eject said pocket outside of the container.

2. In combination, a chain of pockets adapted to receive ice cream bars, a container for receiving said chain of pockets, a seal through which the pockets may be passed to the outside of the container, said seal comprising a wall depending into the container, a compartment slidable along said wall, and an upwardly swinging trap door in the bottom of said compartment, said door adapted to support one of said pockets.

3. A dispensing apparatus for ice cream bars comprising in combination, a chain of pockets within which ice cream bars may be housed, a container for receiving said chain, a cover for said container, and a slidable compartment adapted to move into and out of said container for dispensing said ice cream bars, said compartment being provided with means to support one of said pockets.

4. A dispensing apparatus for ice cream bars comprising in combination, a chain of pockets within which ice cream bars may be housed, a container for receiving said chain, a cover for said container, a slidable compartment adapted to move into and out of said container for dispensing said ice cream bars, and a pivoted trap door in the bottom of said compartment adapted to support the adjacent ice cream bar.

5. A dispensing apparatus for ice cream bars comprising in combination, a chain of pockets within which ice cream bars may be housed, a container for receiving said chain, a cover for said container, a wall depending from said cover into said container, said wall being provided with outwardly flared lower edges, a slidable compartment adapted to move into and out of said container and to be guided by said wall, whereby said ice cream bars may be dispensed from the interior of said container to the exterior thereof, said compartment being provided with means to support one of said pockets.

In testimony whereof I affix my signature.

CHARLES B. BEMIS.